US005412162A

United States Patent [19]

Kindel

[11] Patent Number: 5,412,162

[45] Date of Patent: May 2, 1995

[54] PRE-FORMED SPEAKER GRILLE CLOTH

[75] Inventor: William J. Kindel, San Clemente, Calif.

[73] Assignee: Dana Innovations, San Clemente, Calif.

[21] Appl. No.: 175,186

[22] Filed: Dec. 29, 1993

Related U.S. Application Data

[63] Continuation of Ser. No. 958,820, Oct. 9, 1992, abandoned.

[51] Int. Cl.[6] .......... B32B 7/00; B32B 15/00; B32B 27/34

[52] U.S. Cl. .......... 181/150; 428/266; 428/285; 428/287

[58] Field of Search .......... 428/221, 284, 266, 285, 428/287; 181/156, 199, 148, 150

[56] References Cited

U.S. PATENT DOCUMENTS

| | | | |
|---|---|---|---|
| 3,727,004 | 4/1973 | Bose | 179/1 |
| 3,941,207 | 3/1976 | Croup | 181/156 |
| 4,140,203 | 2/1979 | Niguchi et al. | 428/425.3 |
| 4,365,114 | 12/1982 | Soma | 179/1 |
| 4,441,577 | 4/1984 | Kurihara | 181/147 |
| 4,811,406 | 3/1989 | Kawachi | 381/186 |
| 4,949,386 | 8/1990 | Hill | 181/149 |
| 5,031,720 | 7/1991 | Ohta et al. | 428/260 |

OTHER PUBLICATIONS

Polk MM Series Brochure.
Sonance Speakers "Sonance II" Brochure.
Sonance Speakers "Sonance III" Brochure.
Sonance II, III, and Subwoofer Installation Instructions.
Sonance IV and Sonance I Brochure.
Sonance Speakers "Sonance Subwoofer" Brochure.

*Primary Examiner*—George F. Lesmes
*Assistant Examiner*—Kathryne E. Shelborne
*Attorney, Agent, or Firm*—Stetina Brunda & Buyan

[57] ABSTRACT

A grille cloth for speaker assemblies is preformed into a desired shape and has sufficient rigidity to maintain this pre-formed shape while being supported in a non-tensional manner only at its periphery. The use of such a pre-formed fabric as a grille cloth eliminates a need for non-peripheral support while visually obscuring the components of the speaker assembly behind the grille cloth. The grille cloth is comprised of a polyester material which is substantially transparent to acoustic radiation in the audible frequency range while also being substantially opaque to visible light.

6 Claims, 1 Drawing Sheet

PRE-FORMED SPEAKER GRILLE CLOTH

This is a continuation of application Ser. No. 07/985,820, filed on Oct. 9, 1992, now abandoned.

FIELD OF THE INVENTION

The present invention relates generally to speaker enclosures and more particularly a pre-formed speaker grille cloth having sufficient rigidity to maintain its pre-formed shape while supported only at its periphery. The pre-formed speaker grille cloth of the present invention eliminates the need for non-peripheral support and visually obscures the speaker.

BACKGROUND OF THE INVENTION

In-wall speakers have become increasingly popular in recent years. Such in-wall installations eliminate the well known box-type speaker enclosures which are often difficult to position in a manner wherein they are both aesthetically desirable and provide the desired acoustic affect. In-wall speakers are disposed almost entirely within a wall structure such that only the grille and bezel are exposed. Their position is chosen and fixed at the time of installation such that the desired aesthetic and acoustic results are achieved.

Grille cloths, foam covers, and the like for visually obscuring the components of a speaker assembly are well known. They generally fall into one of three categories: non-supported foam; cloth mounted to a rigid, i.e., metal, wood, plastic, et., grille; and peripherally supported grille cloths.

It is well known to use foam either in combination with a metal grille or alone. Such foam grille covers suffer inherent deficiencies. In order to completely visually obscure the internal components of the speaker assembly, such foam covers must be substantially thick. The use of such thick covers tends to interfere with the transmission of sound therethrough and may even interfere with the motion of the speaker's driver or cone. Additionally, such foam covers tend to degrade in the presence of ultraviolet radiation. Such degradation typically involves a color change and loss of flexibility, often resulting in the foam becoming brittle. Thus, the qualities of both being able to transmit sound and block light represent conflicting parameters in the use of such foam covers. That is, the desire to transmit sound dictates that the cover be as thin as possible and the desire to block light dictates that the cover have a substantial thickness.

Another common method for visually obscuring the components of a speaker assembly is to adhesively bond a flexible cloth material to a perforated metal grille which is then used to cover the speaker assembly. Such perforated metal grilles typically comprise a section of sheet metal having a plurality of apertures, typically approximately 2 mm in diameter, formed thereon and defining a 2-dimensional array. The apertures are typically spaced approximately 3 mm apart. The size and spacing of the apertures is thus insufficient to adequately visually obscure the components, i.e. speakers, of the speaker assembly in a desired manner. The cloth is required to assure that the speaker components are visually obscured since the grille is inadequate at performing this task when utilized alone. The cloth material is generally disposed inside the perforated metal grille such that it is protected thereby. Such construction suffers from the deficiency that it inherently makes painting of the grille extremely difficult.

Intermediate or non-peripheral support is generally provided by adhesively bonding the cloth to the metal grille at portions other than the periphery thereof, i.e. generally about the entire surface thereof. However, the use of such non-peripheral support adds to the complexity of the construction, thus both increasing cost and making removal and installation of the cloth more difficult. As such, the use of such non-peripheral support is inherently undesirable.

Painting of in-wall speaker grilles is frequently required since it is often desirable to have a grille which is complementary in color to its environment, i.e. the walls and/or furnishings. Thus, a desirable aesthetic affect is often accomplished by painting the visible portion of the grille assembly.

However, the painting of a grille having a cloth adhesively bonded to the rear surface thereof presents particular problems. It is not desirable to paint the cloth along with the metal grille since such painting tends to stiffen the cloth and block the pores of the fabric, thereby reducing the cloth's ability to freely transmit sound therethrough.

Thus, it is necessary to first remove the cloth from the metal grille prior to painting and then to re-attach the cloth thereto before the grille is re-attached to the speaker assembly. Removal of the cloth requires manual dexterity and extreme care. It is very easy to stretch or tear the cloth during such removal. The removal and reattachment of the cloth to the grille adds additional undesirable steps to the painting process. Thus, it would be desirable to provide a means for visually obscuring the components of a speaker assembly while facilitating easy painting of the grille.

It is also known to support a grille cloth at only its periphery by stretching it over a frame. However, such frames are inherently complex and thus expensive to fabricate and assemble. They are also subject to problems associated with stretching or tearing of the fabric cover.

As such, although the prior art has recognized to a limited extent the problem of visually obscuring the internal components of a speaker assembly, particularly in in-wall construction, the proposed solutions have, to date, been ineffective in providing a satisfactory remedy.

SUMMARY OF THE INVENTION

The present invention specifically addresses and alleviates the above-mentioned deficiencies associated in the prior art. More particularly, the present invention comprises a grille cloth for a speaker assembly that is pre-formed into a desired shape and has sufficient rigidity to maintain this pre-formed shape while being supported in a non-tensional manner only at its periphery. The use of such a pre-formed fabric as a grille cloth eliminates the need for non-peripheral support, i.e. gluing or adhesively bonding, while visually obscuring the components of the speaker assembly behind the grille cloth. The grille cloth is comprised of a polyester material which is substantially transparent to acoustic radiation in the audible frequency range while also being substantially opaque to visible light.

The use of such a peripherally supported cloth eliminates the problems associated with providing non-peripheral support to such a cloth. That is, fabrication costs are reduced and the ease of removing and replacing the grille cloth is improved.

The use of such a peripherally supported pre-formed fabric grille cloth facilitates the easy painting of the grille. The grille cloth may be easily separated from the grille such that the grille can be painted without likewise painting the grille cloth. Thus, the problems associated with painting of the grille cloth as in the prior art construction are eliminated. That is, the problems of having the grille cloth become rigid and having its pores filled with paint, and consequently becoming less transmissive to sound, are completely eliminated in the pre-formed fabric grille cloth of the present invention. The pre-formed grille cloth of the present invention is merely removed from the grille prior to the painting thereof and re-inserted thereinto subsequent to painting. The ease with which the grille cloth is removed and reinserted into the grille is facilitated by its requirement for support only at its periphery. That is, the grille cloth of the present invention can be easily removed and re-inserted in the grille since it does not require gluing, adhesive bonding, or other non-peripheral support or attachment to the grille. As such, the user may easily paint the speaker's grille to match the surrounding decor as desired without concern as to degrading the quality of the speaker system.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended merely as a description of the presently preferred embodiment of the invention, and is not intended to represent the only form in which the present invention may be constructed or utilized. The description sets forth the functions and sequence of steps for construction and implementation of the invention in connection with the illustrated embodiments. It is to be understood, however, that the same or equivalent functions and sequences may be accomplished by different embodiments that are also intended to be encompassed within the spirit and scope of the invention.

The speaker grille cloth of the present invention is illustrated in FIGS. 1–5 which depict a presently preferred embodiment of the invention.

Figure 1:
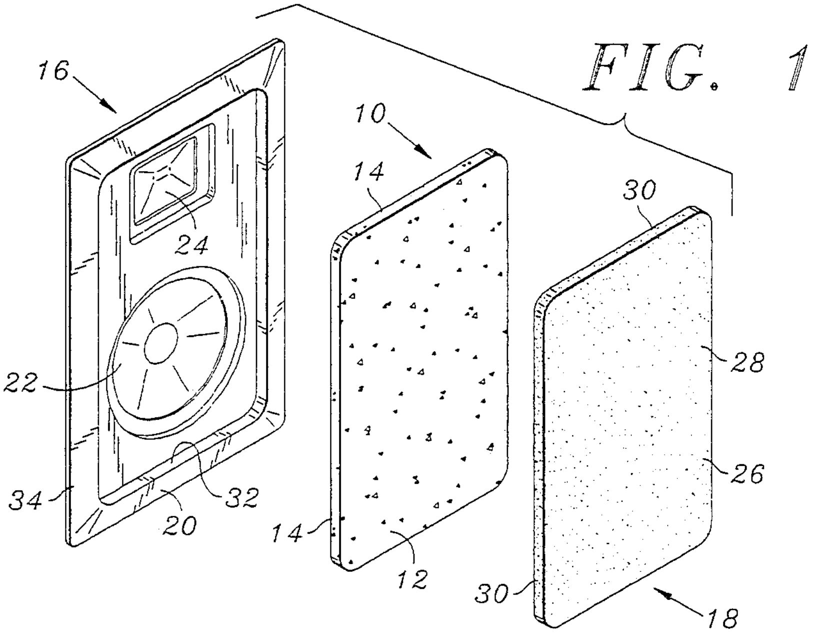
FIG. 1 is an exploded perspective view of the pre-formed speaker grille cloth of the present invention illustrating its position intermediate a speaker wall mount assembly and a perforated metal grille.

Referring now to FIG. 1, the speaker grille cloth 10 is comprised generally of a rectangular planar member 12 having side members 14 formed perpendicularly thereto. Although the present invention is illustrated and described in connection with a generally rectangular planar member, those skilled in the art will recognize that various other geometric configurations are likewise suitable. The use of a generally rectangular configuration is thus by way of illustration only and not by way of limitation.

The perforated speaker grille cloth 10 is disposed intermediate an enclosure and mount assembly 16 and a speaker grille 18. The enclosure and mount assembly 16 is generally comprised of a housing 20, a woofer 22, and tweeter 24. The grille 18 is generally comprised of a planar metal member 28 having a plurality of apertures 26 formed therein. Side members 30 are formed perpendicularly to the planar member 28. Thus, the pre-formed speaker grille cloth 10 of the present invention is configured in size and shape to conform generally to the speaker grille 18.

The pre-formed speaker grille cloth is preferably comprised of a polyester material in the 5–15 oz. range, preferably approximately 10 oz., such as KODEL 11.4 oz. material. This material possesses the desired rigidity while being sufficiently transparent to audible sound frequencies. Those skilled in the art will recognize that various other materials are likewise suitable.

Figure 4:
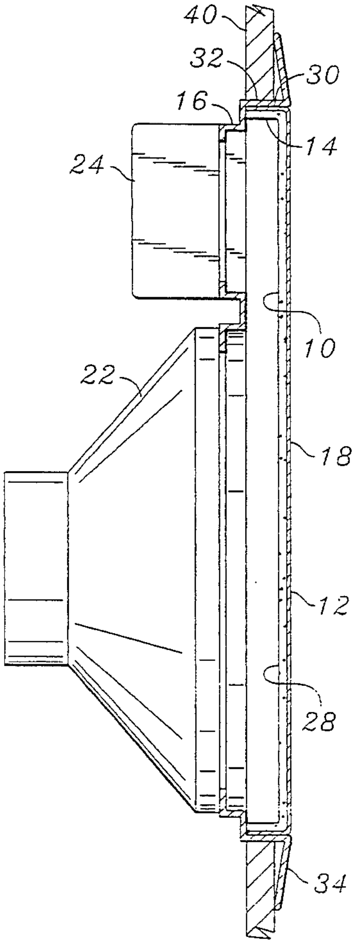
FIG. 4 is an enlarged cross-sectional side view of the in-wall speaker of FIG. 2 taken along line 4 thereof.
Figure 2:
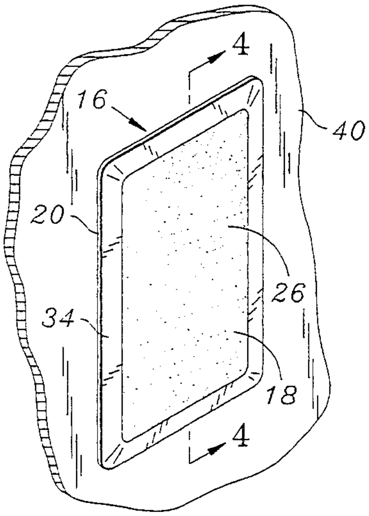
FIG. 2 is a perspective view of an in-wall speaker having a pre-formed speaker grille cloth of the present invention installed therein.
Figure 3:
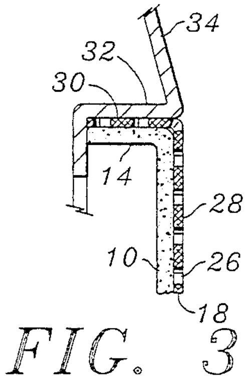
FIG. 3 is a cross-sectional side view of the periphery of the grille cloth, speaker assembly, and grille.

Referring now to FIGS. 2–4, when an in-wall speaker assembly utilizing the pre-formed speaker grille cloth of the present invention is installed within a wall, the speaker components, i.e., the woofer 22 and tweeter 24 are visually obscured by the pre-formed speaker grille cloth 10 such that they are not visible.

With particular reference to FIG. 2, the enclosure and mount assembly 16 is installed within a wall 40 such that the bezel 34, and grille 28 are substantially flush with the wall 40. The grille cloth 12 of the present invention is disposed immediately behind and in laminar juxtaposition to the grille 28 such that the internal components, i.e. the woofer 22 and tweeter 24, are visually obscured and are therefore not visible through the grille 18.

With particular reference to FIGS. 3 and 4, the grille cloth 10 of the present invention is captured intermediate the grille 18 and the enclosure and mount assembly 16. The planar surface 12 of the grille cloth 10 is disposed in laminar juxtaposition to the planar surface 28 of the grille 18. The side members 14 of the grille cloth 10 are captured within and disposed in laminar juxtaposition to the corresponding side members 30 of the grille 18. The grille 18, along with the grille cloth 10, is captured within the side members 32 of the bezel 34 of the enclosure and mount assembly 16. Thus, the grille cloth 10 of the present invention is supported about its periphery, i.e. the side members 14 thereof. The grille cloth 10 is sufficiently rigid to be self-supporting at its planar surface 12, thereby eliminating the need to glue or adhesively bond the grille cloth 10 to the grille 18.

Thus, the grille cloth 10 can be easily removed from the grille 18 by simply pulling the grille 18 from the enclosure and mount assembly 16 and then pulling the grille cloth 10 from the grille 18. The grille cloth 10 may be easily re-installed by simply disposing the grille cloth 10 within the grille 18 and replacing the grille 18 within the enclosure and mount assembly 16 without the use of glue or other bonding agents.

Figure 5:
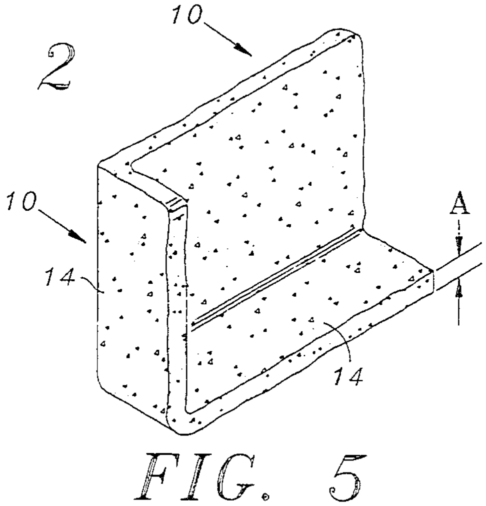
FIG. 5 is an enlarged sectional view illustrating a corner portion of the pre-formed speaker grille cloth of the present invention.

Referring now to FIG. 5, the pre-formed speaker grille cloth of the present invention is formed to have a thickness, Dimension A, of between approximately 1 mm and 5 mm, preferably approximately 2 mm. This thicknesses is sufficient to both provide the required structural rigidity and opacity to visible light. It is also thin enough to allow sound to pass therethrough without substantial degradation. Thus, the pre-formed speaker grille cloth has sufficient rigidity to maintain its pre-formed shape while only being supported peripherally. The need for non-peripheral support is eliminated.

The pre-formed speaker grille cloth of the present invention thus need not be adhesively bonded to a speaker grille. Thus it may be easily detached therefrom such that the speaker grille may be painted separately therefrom. Removal and reinstallation of the pre-formed grille cloth of the present invention is thus comparatively simple due to the rigidity thereof. Use of the pre-formed speaker grille cloth of the present invention thereby simplifies the initial speaker assembly fabrication process and additionally facilitates painting of the grille thereof after or during installation.

It is understood that the exemplary pre-formed speaker grille cloth described herein and shown in the drawings represents only a presently preferred embodiment of the invention. Indeed, various modifications and additions may be made to such embodiment without departing from the spirit and scope of the invention. For example, the grille cloth may be of any size and configuration which compliments the speaker enclosure and need not be generally rectangular as illustrated and discussed. Furthermore, various fabric material other than polyester are contemplated to be likewise suitable for use as the preformed grille cloth of the present invention. Thus, these and other modifications and additions may be obvious to those skilled in the art may be implemented to adapt the present invention for use in a variety of different applications.

What is claimed is:

1. A pre-formed grille cloth disposed within a speaker housing intermediate a apertured grille and a speaker, the grille cloth comprising:

(a) a perforated fabric pre-formed into a shape generally complimentary to the shape of the speaker grille, said shape having a rectangular planar member and a peripheral member extending perpendicular thereto, said fabric:

(i) being substantially transparent to acoustic radiation in the audible frequency range;

(ii) being substantially opaque to visible light; and (iii) having a sufficient rigidity to maintain its pre-formed shape while being supported only at its periphery;

(b) wherein said grille cloth is self-supporting and visually obscures the speaker behind the grille cloth.

2. The grille cloth as recited in claim 1 wherein said fabric is comprised of polyester.

3. The grille cloth as recited in claim 1 wherein said fabric is comprised of polyester in the weight range of approximately 5–15 oz.

4. The grille cloth as recited in claim 1 wherein said fabric is comprised of polyester having a weight of approximately 10 oz.

5. The grille cloth as recited in claim 1 wherein said fabric is between approximately 1 mm and 5 mm thick.

6. The grille cloth as recited in claim 1 wherein said fabric is approximately 2 mm thick.

* * * * *